Patented July 14, 1936

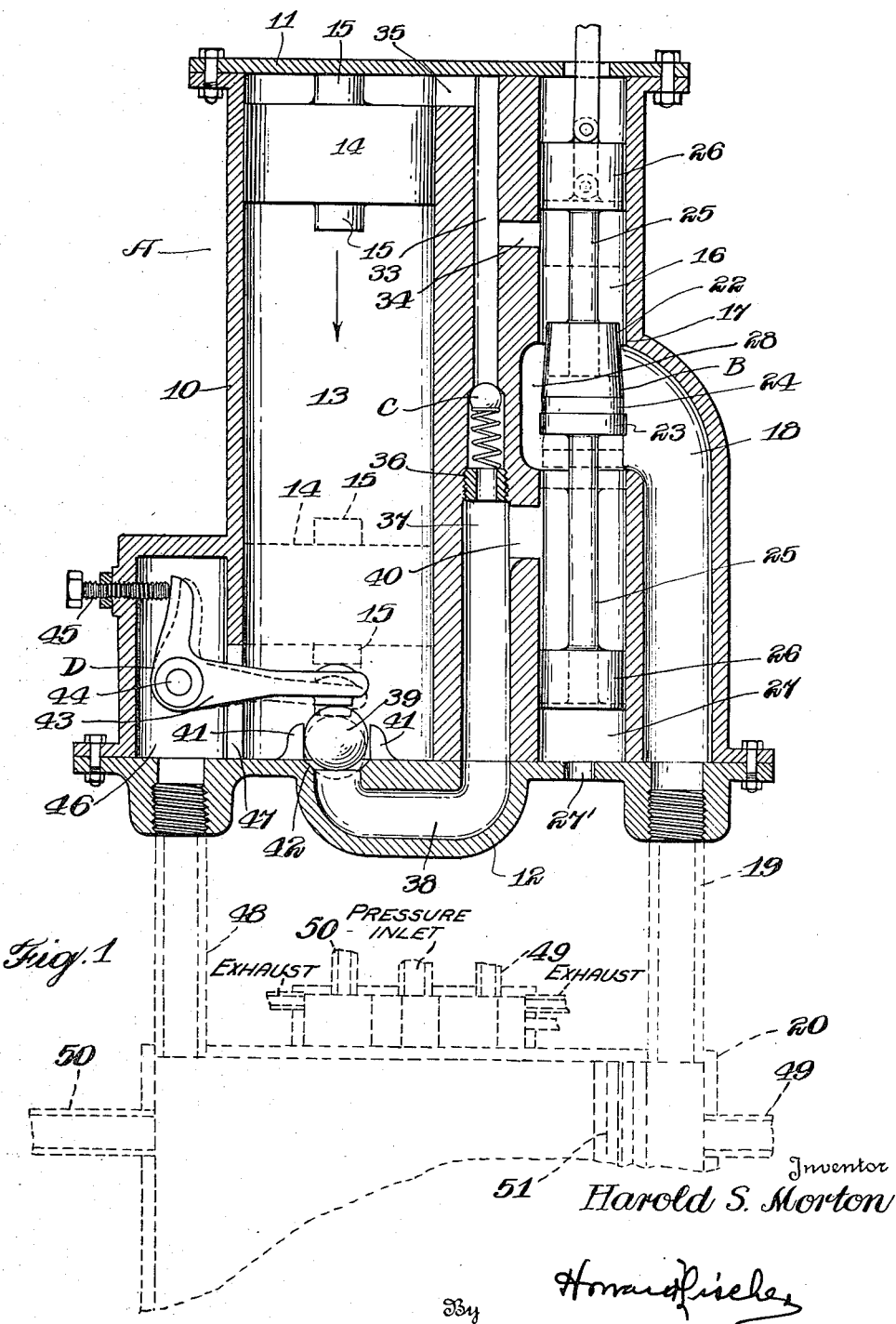

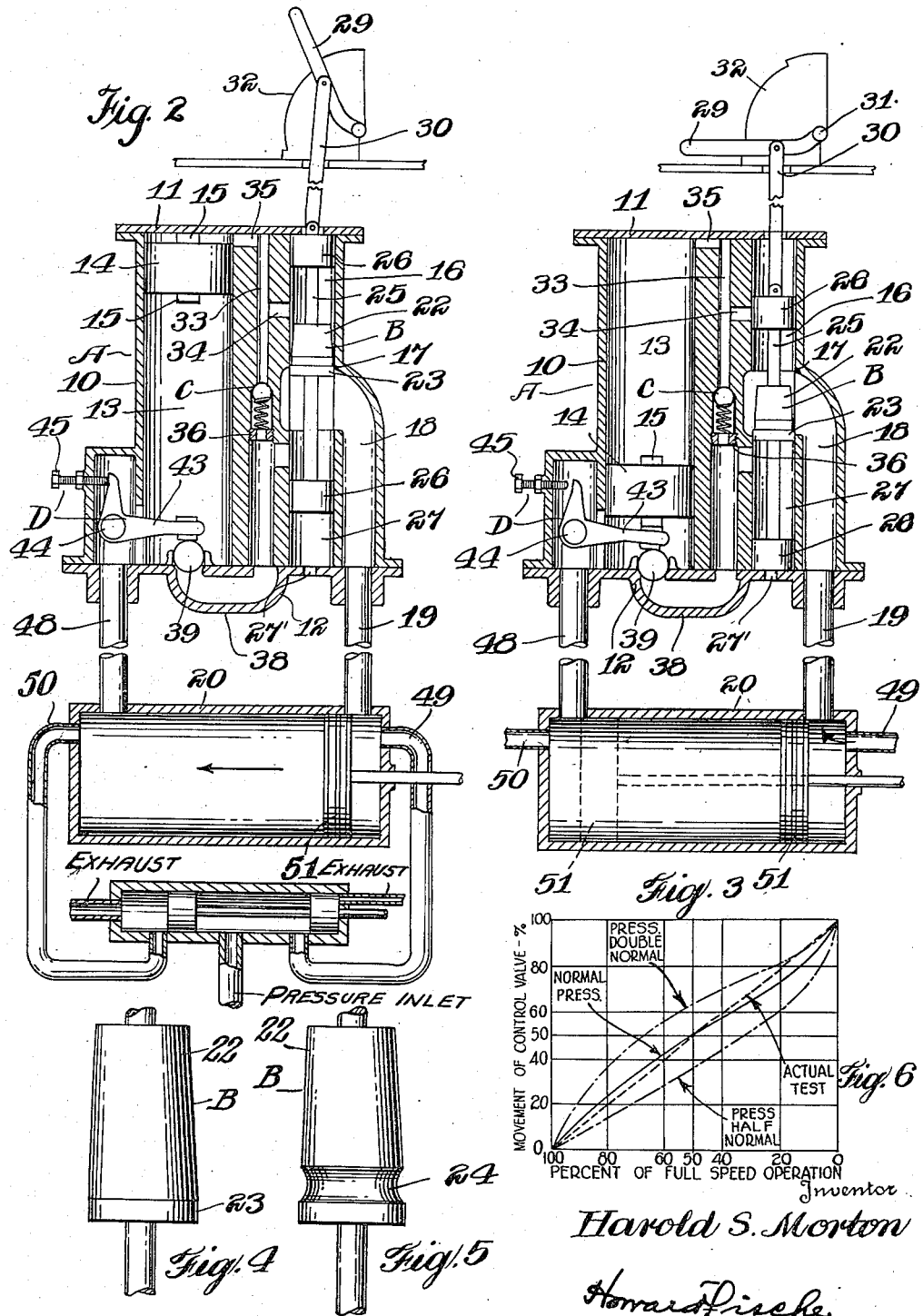

2,047,832

UNITED STATES PATENT OFFICE 2,047,832

HYDRAULIC CONTROLLER

Harold S. Morton, St. Paul, Minn., assignor to The Stott Stoker Company, St. Paul, Minn., a corporation of Delaware Application March 11, 1932, Serial No. 598,181

16 Claims. (Cl. 121—1)

This invention comprises the method for controlling the motion of hydraulically operated mechanism, and employs a hydraulic controller which has a definite operating means, so as to control the operation of the hydraulic operating mechanism through a definite cycle or period of time. The hydraulic controller is particularly adapted for operating hydraulically operated pistons which move back and forth in a cylinder, where it is desired to control the number of cycles which occur in a given interval of time by providing a period of stop during each cycle of movement.

With this controller, the period of stop is repeated indefinitely during each cycle as long as the adjustment of the control means in the controller is left in a set position. The period of stop during each cycle may be varied by changing the position of the control or adjusting means in the controller. With this controller, the period of rest may be anything from zero to several hours.

The controller is provided with means which permits the fluid to by-pass freely during the period of rest, then cutting off the by-pass after the proper interval of time has elapsed which is controlled by the regulator or adjusting means in the controller. In designing this controller, it was desired to have the number of complete cycles in a given interval of time or the number of strokes per hour for a piston or any other device controlled by the controller, vary as nearly as possible in proportion to the movement of the regulating means of the controller. This required a rest period which increased rapidly as the regulator or adjusting means approached the position for the smallest number of cycles or the slowest speed of operation. The purpose for which the controller was designed may be more clearly defined by, for example, suppose a piston makes one complete stroke per minute, or sixty strokes per hour at full speed with no rest period. Then the regulator of the controller should be set so that a fifty per cent movement of the same would produce a one minute rest period and give fifty per cent of full speed or thirty strokes per hour. But the next twenty-five per cent movement, which is seventy-five per cent of the total movement of the regulator of full speed position, should increase the rest period from one minute to three minutes in order to provide a total cycle of four minutes or fifteen strokes per hour. Then fifteen per cent more movement of the regulator which would give ninety per cent from full speed, would increase the period of rest from three minutes to nine minutes and resulting in a ten minute total time for the cycle or six strokes per hour of the piston, which is ten per cent of the full speed.

In my controller, the time interval of rest is controlled by the flow of liquid past the tapered portion of the controller plug which is introduced a greater or less distance into the bore of the valve body, which surrounds the control plug. The space around the tapered plug forms an annular capillary passage for the flow of liquid, or in other words, the proportions and dimensions of the plug are such that the flow of liquid is governed by the laws applying to capillary flow of thin filaments, rather than by those governing hydraulic flow through large orifices. Therefore, the flow of a thin annular filament of liquid varies directly as the pressure, inversely as the length, and directly as the cube of thickness of the filament.

To properly design my controller, it required integration by calculus to determine the flow of the liquid by the tapered controlling plug or valve at various positions with a variable length of flow and a thickness of filament which varied from end to end and had a different minimum value for every position of the control plug. I have found that a mathematical analysis indicated that a proper selection of dimensions, with correct relationship to the back pressure, produced by the by-pass valve, the normal time of cycle of the machine at full speed operation, and the quantity of liquid which has to flow by the plug before the by-pass valve closes, would result in a very nearly linear relationship between the plug movement and the percentage of full speed operation. Thus, by mathematical calculation, I was able to provide a hydraulic control with a control valve plug having a certain taper and of proportion and shape operable with a defined orifice so as to accomplish the desired result to permit the controller to be regulated or adjusted by the movement of the control valve or plug into the desired position so that the relative proportional movement gave the desired definite result of providing a certain period of rest in each cycle throughout a given period of time so that a hydraulically operated piston may be operated by my controller to make a certain number of strokes in each cycle of time and to regulate the number of strokes by the adjusting means of the controller to any number desired in a given cycle or period of time.

I have illustrated a chart which shows the theoretical curve of a normal setting or adjustment of the controller to give fifty per cent of full speed at fifty per cent of movement from normal full speed of the regulator or the adjusting means of the controller. I have found by actual tests of my controller that distortion of the curve of operation of the controller was comparatively little in the effect of doubling or halving the back pressure. There are, of course, changes which take place in the viscosity of the liquid which would affect the rate of flow of the same, like changes of pressure. The various features, details and advantages of my controller will be more fully and clearly set forth throughout the specification and claims.

The drawings are for the purpose of diagrammatically illustrating the combination of certain elements to accomplish the functions of my hydraulic controller and to define the method of the invention. The invention includes the method of metering a time interval by passing a liquid under controllable pressure through an adjustable orifice or valve until a given quantity of liquid has flowed through the orifice.

The drawings will assist in defining the operation of the controller and the method carried out in the invention.

In the drawings forming part of this specification:

Figure 1 is a diagrammatic sectional view through my hydraulic controller, as associated with a cylinder and piston illustrated in dotted outline and only a portion of the same being shown.

Figure 2 shows another diagrammatic sectional view of my controller with a cylinder and piston hydraulically operated and controlled by my controller, with the regulating means of the controller set in a different position.

Figure 3 is a similar view to Figure 2, showing the regulator or adjusting means of the controller set in a different position.

Figure 4 shows one form of the tapered valve or plug of the controller.

Figure 5 shows another form of the valve or plug of the controller.

Figure 6 is a chart showing a geometrical curve for a normal setting to give fifty per cent of full speed at fifty per cent movement of the adjusting means of the hydraulic controller.

Each of the Figures 1 to 3, inclusive, are of a similar diagrammatic nature and may be taken on a horizontal plane or a vertical plane, or the parts illustrated may be on different planes in relation to each other, the diagrammatic illustrations in these figures simply illustrating the members associated together to permit the defining of the method and to more clearly illustrate the operation of the method in practice.

To assist in describing the method the drawings illustrate the controller A formed with a casing 10 upon which an end portion 11 is secured and an end portion 12 is attached oppositely to the end 11 to the casing 10. The casing 10 is provided with a measuring chamber 13 in which the measuring piston 14 is adapted to operate back and forth. The piston 14 is provided with stops 15 on either side thereof to limit the movement of the piston within the chamber 13 and the purpose of which will be later described.

Adjacent the measuring chamber 13 I provide a valve chamber 16 which is formed with an orifice 17 on one end thereof. This chamber 16 opens through the orifice 17 into the passageway 18, and the passageway 18 is connected by a suitable pipe 19 to one end of a hydraulic cylinder 20 which is illustrated in Figure 1 in dotted outline. The cylinder 20 may be any other device adapted to be operated by hydraulic means to provide an operating motion to any element or device which is to be controlled through my method and by means of a controller such as A employed in carrying out my method.

The controller A is provided with a valve member B having a tapered end 22 which is adapted to operate in and out of the orifice 17. This valve is provided on one end with a cylindrical portion 23 and adjacent the end 23 the tapered surface 22 may be cut away at 24, the purpose of which will be later described. The valve B is carried by the shafts 25 projecting from either end thereof and on the outer ends of these shafts I provide cylindrical bearing portions 26 which are adapted to operate in the valve chamber 16 and in a complemental chamber 27 which extends beyond the orifice 17 and is positioned adjacent the passageway 18. The inner end of the passageway 18 is enlarged at 28 adjacent the orifice 17 to provide an enlarged chamber portion 28 around the valve B. This provides the enlarged chamber portion 28 intermediate the chambers 16 and 27. The bearing ends 26 support the valve B centrally in the orifice 17 and adjustable by the adjusting lever 29 which is connected by the link 30 to one of the cylindrical ends 26.

The lever 29 is pivoted at 31 and operates in conjunction with the quadrant 32 which is gauged to indicate the position of the lever 29 so as to show the relative adjustment of the valve B in the orifice 17.

A passageway 33 is formed in the body of the casing 10 between the chamber 16 and the measuring chamber 13 and extending virtually parallel thereto. The passageway 33 is connected by the passageway 34 to the valve chamber 16. The passageway 33 is connected to one end of the chamber 13 by the passageway 35 which is formed adjacent the end 11. In the adjustment of the valve B one of the cylindrical ends 26 operates in certain positions to close the passageway 34, as illustrated in Figure 1 in dotted outline, and illustrated in full lines in Figure 3.

The passageway 33 is provided with a spring ball check C which is held in place by the tubular collar 36 to normally close one end of the passageway 33. The chamber 27 is provided with an opening 27' which permits the air or fluid to be ejected from the chamber 27 in the movement of the cylindrical end 26 positioned toward the opening 27'.

An enlarged passageway 37 is formed extending virtually axially with the passageway 33 and connecting with the passageway 38 on one end, which is formed in the end member 12. The passageway 38 connects through the ball check 39 with the chamber 13. The other end of the passageway 37 connects through the collar 36 with the passageway 33 so that fluid may operate the ball check C and permit passage of the fluid past the ball check C from the passage 33 into the passageway 37. A passageway 40 connects the chamber 27 with the passageway 38.

The ball check 39 is held in one end of the chamber 13 by the guide lugs 41 and this ball check may raise from its valve seat 42, when fluid pressure is passing through the passageways 37 and 38 to permit fluid to enter into the chamber 13. The ball check 39 somewhat impedes passage of fluid so that some fluid is forced into the chamber 13 above the piston 14. The limit of movement of the ball 39 is regulated by the adjusting means D which includes the bell crank lever 43 pivoted at 44 and adjusted by the screw 45. The supporting of the bell crank lever 43 is within the chamber 46, which is positioned adjacent one end of the chamber 13 and which is formed as a part of the casing 10 of the controller A. By means of the opening 47, fluid may pass from the chamber 46 into the chamber 13 or vice versa, and this opening 47 also permits the working end of the lever, which engages with the ball 39, to extend therethrough. Working surfaces are formed on either side of the free end of the working end of the lever 43, one of which engages with the ball 39 and the other being engaged part of the time by one of the lugs 15 when the measuring piston 14 is in the position illustrated in dotted outline in Figure 1, or in the position illustrated in full lines in Figure 3.

A suitable connecting pipe 48 connects the end of the cylinder 20 opposite to the pipe 19 with the chamber 46 of the controller A.

Fluid pressure inlet pipes 49 and 50 positioned at the opposite ends of the cylinder 20, diagrammatically illustrate the inlet from a source of fluid pressure which is adapted to be controlled by a valve to alternate the pressure from one end to the other of the cylinder 20, so as to operate the piston 51 in the cylinder 20 to reciprocate the same.

Neither the slide valve nor the source of fluid pressure for operating the piston 51 in the cylinder 20 is illustrated in the drawings, it will be apparent that the source of fluid pressure as well as the slide valve for reversing the pressure in the ends of the cylinder 20 may be of a suitable nature to accomplish the desired result.

In operation the controller A operates to control the period of rest between the cycles of operation of the piston 51 or to permit the piston 51 to continue to operate so that it will reciprocate back and forth to do the work required of it. In the operation of the piston 51 where no lay-by period is desired and the piston is to continue to operate, then the regulating lever 29 is set in the position illustrated in Figure 3. This positions the valve B as illustrated in Figure 3 and sets the cylindrical member 26 in position to close the port 34, while the cylindrical portion 23 of the valve B closes the end of the chamber 27, so that fluid pressure introduced through the pipe 49 to the piston 20 cannot pass through the pipe 19 to the passageway 18 or through the controller A. This will cause the fluid pressure introduced through the pipe 49 to operate against the piston 51 and cause the same to move toward the other end of the cylinder 20. When the piston reaches the opposite end of the cylinder 20, illustrated in dotted outline in Figure 3, the slide valve automatically reverses the pressure into the cylinder 20 by directing the fluid pressure through the pipe 50 against the other side of the piston 51. While the controller A is set by the lever 29 in the position illustrated in Figure 3, the piston 51 will continue to reciprocate back and forth without lay-by or resting at the end of each cycle, considering the full line position of the piston 51 as the starting point, as illustrated in Figure 3. It will be apparent that while the piston 51 is being operated with the controller A set as illustrated in Figure 3, that on the return stroke from the dotted position, pressure coming in through the pipe 50 cannot pass through the controller because the check valve 39 will move into closed position and be held there by the fluid pressure, nor can the piston 14 move out of its position illustrated, because the passageways for fluid in the controller A are shut off, namely, by the closing of the port 34 and the end of the chamber 27. Thus the piston 51 is operated on its return stroke under the pressure from the source of fluid supply.

The controller A may be set by means of the regulator lever 29 to position the valve B in the position illustrated in Figure 1, or in any similar position where the valve B is introduced adjacent or into the orifice 17 of the chamber 16. The position or the degree of entrance of the valve B in relation to the orifice determines the time of rest of the piston 51. For instance, with the valve B set in the position illustrated in Figure 1, and fluid pressure being introduced through the pipe 49 to the cylinder 20, the fluid pressure will pass through the pipe 19 into the controller passageway 18 and will pass around the valve B into the passageway 16 and through the port 34 into the passageway 33. From this passageway if the measuring piston 14 is in full line position, illustrated in Figure 1, the fluid pressure will pass from the passageway 33 out of the passageway 35 and move the measuring piston 14 into the position illustrated in dotted outline. If, however, the measuring piston 14 is already in the dotted line position, or if it was in full line position in Figure 3, then the measuring piston 14 will remain in that position and tend to hold the retarding check valve 39 in closed position, causing the piston 51 to move from dotted line position in Figure 1, to the other end of the cylinder 20, whereupon fluid pressure being reversed and coming in through the pipe 50, some of the same will pass up through the pipe 48 and through the chamber 46, through the passageway 47 and into the chamber 13 to cause the measuring piston 14 to move into the full line position illustrated in Figure 1. The movement of the piston 14 in the chamber 13 from the dotted line position to the full line position, is comparatively instant, whereas its movement in the other direction is governed by the position of the valve B. Therefore, the valve B controls the interval of time of rest of the working element or piston 51 in accordance with the time that it takes to move the piston 14 from its full line position in Figure 1, to its dotted line position. The controller A may be operated by the regulating lever 29 into the position illustrated in Figure 2, which moves the valve B to close the orifice 17 and permit the leakage of pressure from the pipe 49 through the pipe 19 through the passageways 18 and 27, out of the port 40, and through the passageways 37 and 38, and by the retarding check valve 39, to the other side of the piston, permitting the fluid pressure to exhaust without movement of the piston 51. Thus in this position of the lever 29 the controller A operates to hold the piston 51 at rest. This is considered a stop position of the controller A.

The controller A may be made of any suitable design or shape and the regulating lever 29 may be connected in any suitable manner to operate the valve B thereof so as to set the valve in different positions in relation to the orifice 17. In the position illustrated in Figure 2 of the valve B, the orifice 17 is closed. The valve B may be under-cut as illustrated in Figure 5, at 24, to minimize the back pressure over the use of a straight taper 22, like illustrated in Figure 4, or a portion of the taper may be cut away as illustrated in Figure 1, to relieve the back pressure when the valve penetrates more deeply into the orifice.

To determine the minimum speed the diagrammatic chart illustrated in Figure 6 may be referred to which illustrates the degree of movement of the control valve along the vertical side of the chart, while the horizontal portion of the chart illustrates in degree the per cent of full speed operation. The curves on the chart illustrate the normal pressure curve, a double normal pressure, and one half normal pressure, to illustrate the relative working curves by the setting of the regulator lever 29 of the controller A. Thus referring to the chart, taking ten per cent of full speed along the horizontal line of the chart illustrated by degrees, and projecting down to the normal pressure curve to find the movement of the control valve, it will be noted the same would be ninety degrees so that when ninety per cent of the control valve B is within the orifice 17, then the speed would be ten per cent of normal full speed. In other words, the valve B would regulate the flow of fluid pressure to operate the measuring piston so that the time it would take the measuring piston to move from the position illustrated in full lines in Figure 1, to the position illustrated in dotted lines, would determine the period of rest for the working piston 51, it being apparent that the fluid pressure would by-pass through the controller A past the retarding valve 39 until the measuring piston 14 moved into dotted line position to hold the valve 39 closed.

The size of the orifice 17 together with the taper and size of the valve B has been computed mathematically to give the correct dimensions of the same so that the regulating lever 29 could be operated in a manner to virtually positively control and regulate the controller A so as to govern the operation of the piston 51 by the controller A. Thus the controller A might be termed a governor for regulating the number of operations or cycles of operation of the piston 51 during a given period of time and by means of the lever 29 the governor or controller A may be readily set. The quadrant 32 may be marked with gauge marks, such as 32', for the setting of the lever 29 and suitable indicia, not illustrated, may be indicated upon the quadrant 32 to indicate the number of operations for the given setting, as indicated by the gauge marks.

The particular construction and formation of the governor or controller A is immaterial, the same being illustrated in the form shown merely for the purpose of assisting in describing the method and the application of the controller or governor is equally merely for the purpose of assisting in describing the method.

In accordance with the patent statutes I have described the principles of the method, and variations may be made in the construction illustrated as well as in the application of the method or principle within the scope of the following claims.

I claim:

1. A controller for hydraulically operated devices in which the pressure is periodically reversed including a metering valve, a closed measuring chamber, means for adjusting the position of said valve in said controller to change the time required to fill said measuring chamber and to build up a pressure therein, and means in said measuring chamber operated by the full pressure of the reversed flow of pressure to force out the liquid filling the measuring chamber to operate the device intermittently in accordance with the setting of said controller and the time required to fill said metering chamber.

2. A hydraulic controller operable with reversible pressure devices including a measuring chamber, means connecting said measuring chamber and said reversible device, a measuring piston operable in said chamber, by-pass means around said chamber, an adjustable valve and valve orifice having means to regulate the flow of fluid to said measuring chamber to operate the measuring piston in one direction, means operable by said piston to close said by-pass, said piston movable in the other direction by hydraulic pressure when the pressure is reversed to empty said chamber.

3. A controller for hydraulic operated devices for controlling the time of rest between intermittent operations of the devices including a fluid measuring cylinder, a pair of connections therefor alternately transmitting hydraulic pressure thereto, a by-pass around said measuring chamber, a check valve for preventing flow of liquid through said by-pass in one direction, a regulating valve in one of said connections to said cylinder for adjusting the time required to fill the measuring cylinder, and means for closing said check valve when said cylinder is filled to prevent flow through said by-pass in either direction.

4. A controller for hydraulically operated devices comprising a body portion having a pair of openings therein alternately subjected to fluid pressure, a fluid measuring chamber connected between said openings, a by-pass between said openings around said chamber, a check valve in said by-pass to prevent flow therethrough in one direction, and means for closing said check valve to prevent flow in either direction.

5. A controller for reversibly operable hydraulically operable devices including a reversible piston and a source of liquid alternately directed to one side of said piston and then the other, said controller including, a measuring chamber, means connecting said measuring chamber to one side of said piston, and measuring means in said chamber operable to receive liquid to relieve the pressure on said one side of said piston, said measuring means operating to stop the flow of liquid when said measuring chamber is filled to direct the liquid against said piston to move the same.

6. An automatic controller for reversible hydraulically operated devices adapted to be interposed in the line of hydraulic pressure for operating the devices, by-pass means, check valve means in said by-pass, an adjustable slidable valve means in connection with said by-pass, a measuring compartment having a measuring piston therein in connection with said valve, a cylindrical valve orifice and a tapered end formed on said valve operable with said valve orifice to permit said valve to be adjusted to set said controller to operate automatically by periodically reversing hydraulic pressure to cause the devices to be operated hydraulically continuously or intermittently with predetermined periods of rest between the operations of the devices, the time of the period of rest being determined by the setting of said valve.

7. A hydraulic controller for causing intermittent operation or full time operation of reversible hydraulically operated devices including valve means in connection with a reversible hydraulic pressure line, a measuring chamber associated with said valve, a by-pass about said valve and chamber, means for adjusting said valve to automatically bypass a portion of the fluid to said measuring chamber and the remainder of the fluid to the exhaust, means for closing the exhaust bypass when said chamber is filled, the setting of said valve determining the period of time it takes for fluid to fill said chamber, said closing means acting as a check valve to close said by-pass to fluid passing in but one direction, and the filling period of said measuring chamber determining the length of time liquid is bypassed and the period of rest of the hydraulic operated devices regulated by said controller.

8. A hydraulic controller for a reversibly operable device including, a fluid measuring chamber, means connecting one end of said chamber with a reversibly operable device, a valve in said connecting means, means in said chamber for preventing a flow of fluid continuously through said chamber, means for regulating said valve, a continuously open passage from the other end of said chamber to said reversibly operable device, a by-pass around said chamber and valve, and means for closing said by-pass when said chamber is filled to utilize the pressure for moving said reversibly operable device in one direction.

9. A hydraulic governor in combination with a device adapted to be reversibly reciprocated by hydraulic pressure, means for connecting said governor with said device, means in said governor for by-passing hydraulic pressure away from said device and to the exhaust for a pre-determined period of time, means in said governor to close said by-pass means for automatically operating said device by hydraulic pressure after said period of time, and said by-pass closing means operated by the reversal of the hydraulic pressure in said governor automatically resetting said means for causing a period of rest in the operation of said device whereby said device may be intermittently retarded for a period of time in each cycle of operation.

10. A hydraulic governor in combination with a device adapted to be reversibly reciprocated by a continuous flow of hydraulic pressure, means for connecting said governor with said device, means in said governor for continuously by-passing the flow of hydraulic pressure away from said device for a pre-determined period of time, means for setting said governor to give different pre-determined periods of time, means in said governor for automatically closing said by-pass of said device by hydraulic pressure after said period of time, the reversal of the hydraulic pressure automatically resetting said by-pass closing means, whereby said device may be intermittently retarded for a period of time in each cycle of operation.

11. A hydraulic controller in combination with a reversible hydraulic device including, a body, a pair of connections from said reversible device to said body, a by-pass through said body from one connection to the other, means for preventing passage of hydraulic pressure in one direction, variable means for timing in communication with high pressure when said pressure is in the other direction, and means operable by said timing means to close said by-pass after a pre-determined period of time.

12. A hydraulic controller for use with a hydraulically operated piston including, means for applying high pressure alternately to one side and then the other of said piston, a controller body, passages to said body from opposite sides of said piston, one of said passages being connected with high pressure and the other connected with exhaust pressure, a by-pass in said controller, connecting one of said passages with the other, and variable timing means for closing off said by-pass after said timing means has been exposed to high pressure a pre-determined length of time.

13. A hydraulic controller for reversible pressure devices including a body portion, a fluid measuring chamber formed in said body portion, a reciprocable piston in said chamber, stop lugs formed on either side of said piston to limit the movement thereof, a ball check valve in one end of said chamber interposed in the path of fluid pressure in said controller, a bell crank extending into said chamber for limiting the movement of said ball check, means on said body portion for setting said crank, a control valve in connection with said fluid pressure for regulating hydraulic pressure to said chamber, means for setting said valve into pre-determined positions, and passageways connecting said controller with a cylinder and piston having a continuous hydraulic pressure supply, said control valve regulating the operation of said piston to stop said piston in one position of said valve, to provide a pre-determined period of rest in each cycle of operation of said piston in other positions of the valve and to provide an ineffective position of said valve wherein said valve is out of metering position and said piston operates without any rest period.

14. A controller for a hydraulic operated device having one end connected to pressure and another end connected to exhaust and in which the pressure is periodically reversed including a timing device, means connecting one end of said timing device to one end of said hydraulically operated device, a continually open passage from the other end of said timing device to the other end of said hydraulically operated device, a by-pass between said connecting means and said passage and closing means for said by-pass, said timing device including means hydraulically operable for operating said closing means for said by-pass.

15. A timer for hydraulically controlled devices in which the pressure is periodically reversed including means connecting the device and the timer, means for by-passing to the exhaust the greater part of the hydraulic pressure from the devices for a predetermined period, means for automatically shutting off the diversion of the hydraulic pressure, causing it to become effective on the devices to operate the same, the reversal of the pressure automatically resetting said shutting off means to repeat the operation in accordance with the setting of the controller.

16. A controller for a hydraulically operated device in which the pressure is periodically reversed including, a timing means, a by-pass about said timing means, connecting means connecting said timing means with said device, a longitudinally slidable valve controlling a passage from one of said connecting means to said timing means, means in said by-pass operable by said timing means to stop the flow therethrough, said stopping means acting as a check valve to prevent flow of liquid in more than one direction, a cylindrical orifice for said valve, and a tapered end on said valve, the taper of which is proportional to said orifice, whereby longitudinal movement of said valve regulates the flow into said timing means.

HAROLD S. MORTON.